Feb. 5, 1924.　　　　　　　　　　　　　　1,482,785
C. R. COOLIDGE
COTTON BOLL WEEVIL EXTERMINATOR
Filed July 5, 1922　　　　3 Sheets-Sheet 3
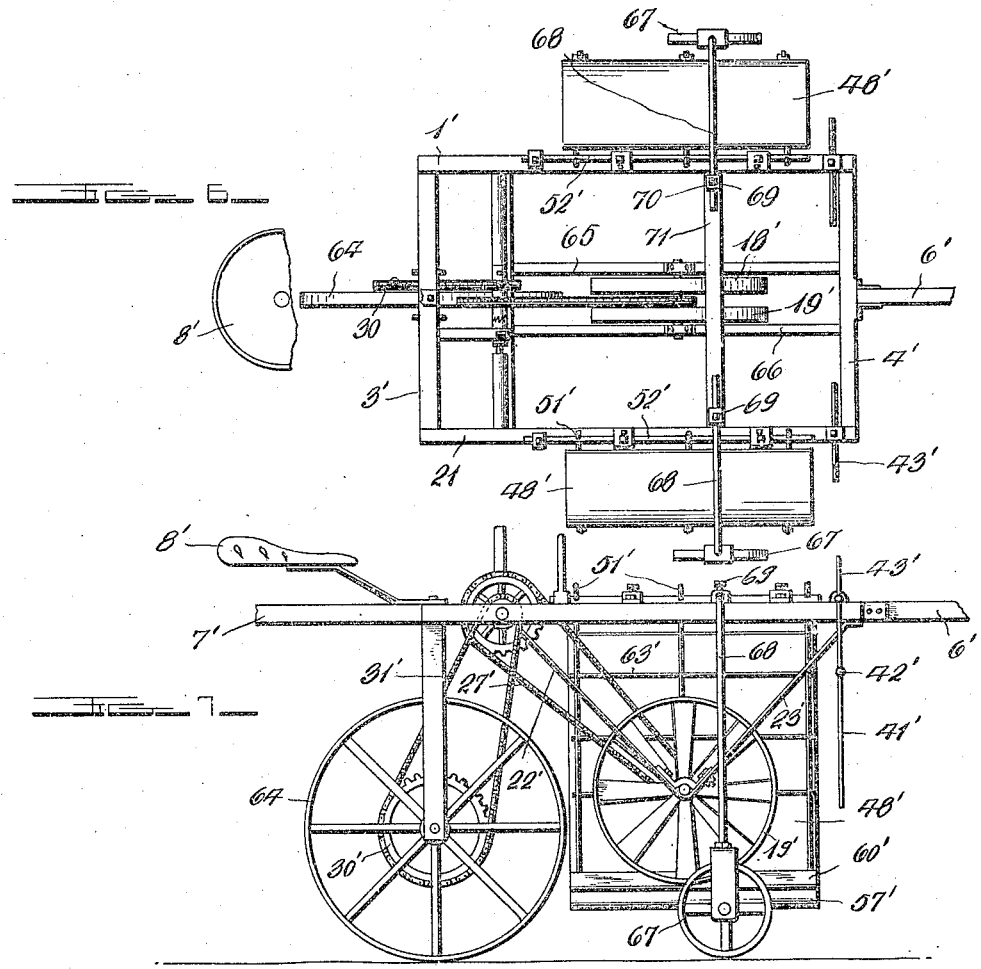
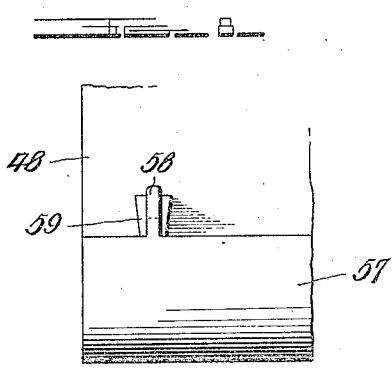
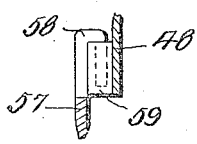
Inventor
Charles R. Coolidge
By Townshend & Townshend
Attorneys Patented Feb. 5, 1924.

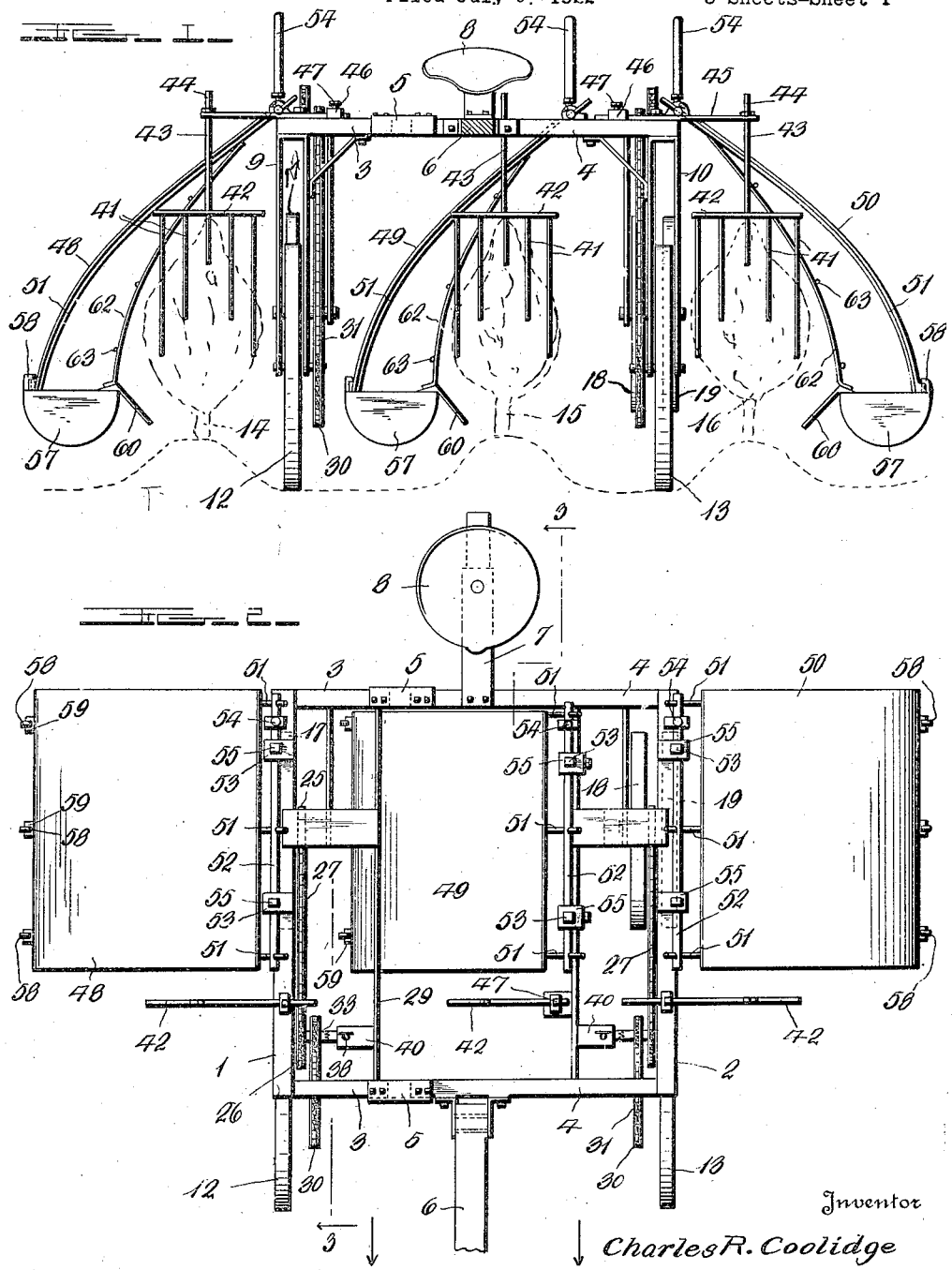

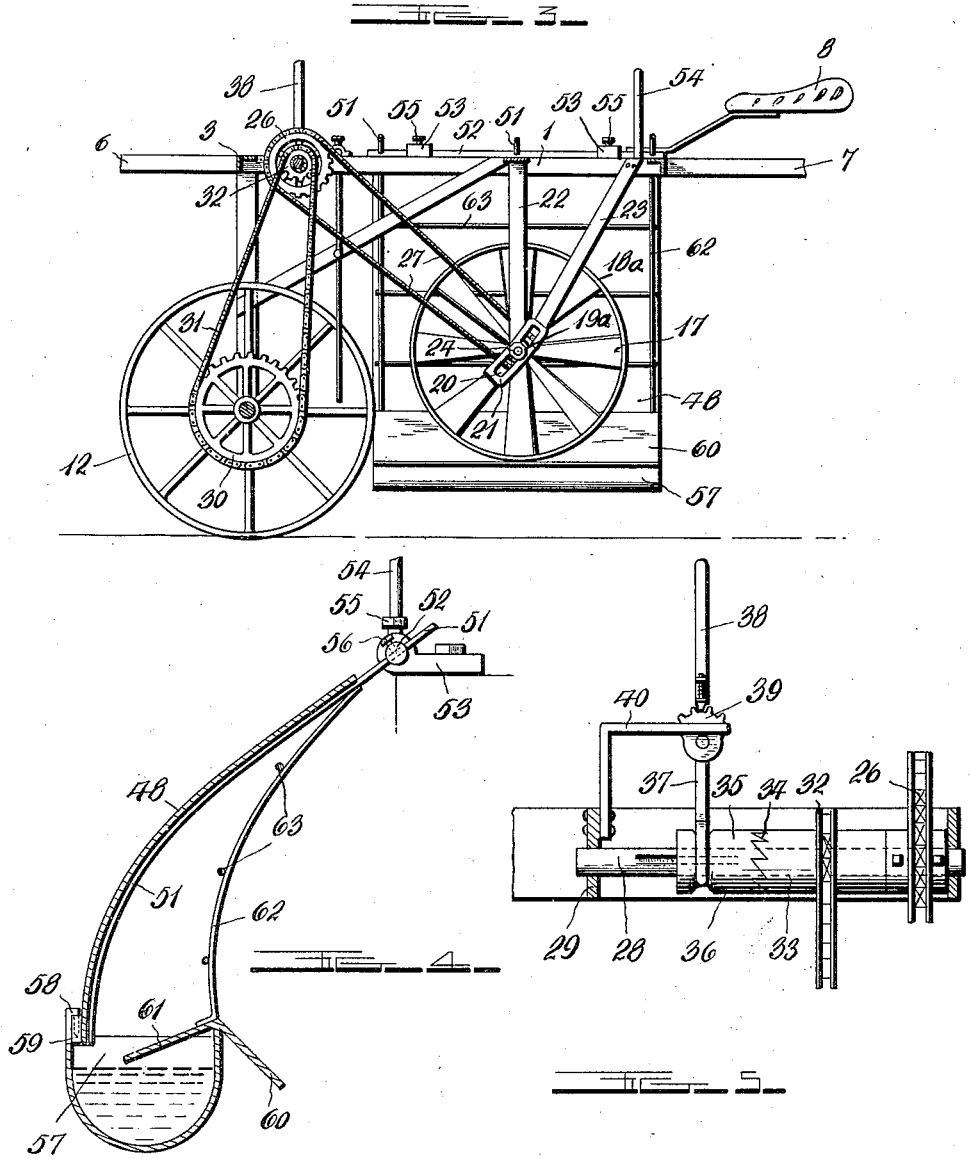

1,482,785

UNITED STATES PATENT OFFICE.

CHARLES R. COOLIDGE, OF HELENA, ARKANSAS.

COTTON-BOLL-WEEVIL EXTERMINATOR.

Application filed July 5, 1922. Serial No. 572,905.

*To all whom it may concern:*

Be it known that I, CHARLES R. COOLIDGE, residing at Helena, in the county of Phillips and State of Arkansas, have invented new and useful Improvements in Cotton-Boll-Weevil Exterminators, of which the following is a specification.

My invention relates to agricultural implements and particularly to that class of implements designed to be used in the treatment of cotton during its growth.

The primary object of the invention is to provide a machine for destroying the cotton boll weevil, together with all punctured cotton squares. In the accomplishment of this object the machine is so constructed as to provide an efficient and novel means for catching and destroying the cotton boll weevil, together with all punctured cotton squares and other rubbish that collects from time to time on the cotton stalk impeding its growth.

Another object of the invention is to provide a machine of this character in which novel means is provided for directing a forced air current across the cotton stalk, which means cooperate with striker mechanism located directly in advance of the forced air current, whereby the boll weevil and the punctured cotton squares will be dislodged before coming within the influence of the forced air.

Another object of the invention is to provide a machine of this character in which all parts are adjustable to provide for various stages of cotton growth as well as for differences in placing of the rows of cotton, and which is equipped to take care of three rows of cotton at one operation.

Another object of the invention is to provide a machine of this character which is extremely compact and very efficient in operation, and which is adapted to be used with cultivating mechanism when desired.

With these and such other objects in view, as will be apparent from the description, my invention resides in the novel construction, combination and arrangement of parts hereinafter described and claimed, and illustrated in the accompanying drawings, of which—

Figure 1 is an end elevation of the machine constructed in accordance with the invention;

Figure 2, a top plan view thereof;

Figure 3, a longitudinal section substantially on the line 3—3 of Figure 2;

Figure 4, a detail vertical section of an element employed in catching the material blown from the cotton stalk;

Figure 5, an elevation of the clutch mechanism used in connection with the fan;

Figure 6, a top plan view of a modified form of the machine;

Figure 7, a side elevation of the modification illustrated in Figure 6;

Figure 8, a detail elevation of the manner of connecting the retaining troughs to the collecting shields; and Figure 9, a further enlarged detail illustrating this connection.

In the improved and preferred form as illustrated in Figures 1 and 2, the invention comprises a wheeled frame consisting of two sections formed of longitudinal side bars 1 and 2, carrying respectively laterally extending end members 3—3 and 4—4. Plates 5 are disposed over the meeting ends of the end bars 3—3 and 4—4, as best illustrated in Figure 2, being so constructed and arranged that the lateral adjustment of these end bars may be made to provide for a lateral extension or contraction of the frame. One end bar 4 is provided with a draft tongue 6 extending forwardly of the machine and an additional draft tongue 7 extending rearwardly thereof, to which may be attached a cultivator not shown. The rear draft tongue 7 also carries thereabove a suitable seat 8 for the driver or operator of the machine. Depending from the forward ends of the longitudinal side bars 1 and 2 are forks 9 and 10, between the lower ends of which are journaled the main bearing wheels 12 and 13 for supporting the frame, which wheels are adapted to travel between the rows of cotton stalks designated as 14, 15, 16.

Disposed in the frame in alignment with the main bearing wheels and directly in the rear thereof, are fans 17, 18, and 19. The fan 17 is disposed at the side of the frame directly in the rear of the main bearing wheel 12 and comprises in this instance an eight-bladed fan constructed with the usual annular end ring 18ª, mounted on a bearing 19ª, extending laterally through an arcuate slot 20, disposed in the lower end of the depending bracket 21, formed at the lower ends of depending supporting arms 22 and 23, connected to the longitudinal frame bar 1 at their upper ends. The end of the fan bearing shaft 19 is provided with an adjusting nut 24 whereby the height of the fan may be regulated by moving the bearing within the slot 20. The fan 17 carries a sprocket 25 in driven connection with the sporcket 26 through the medium of a chain 27, the sprocket 26 being rigidly connected to a shaft 28 journaled at one end in the adjacent side bar of the frame and at the opposite end in a supplemental longitudinal bar 29 extending lengthwise of the frame. The main drive wheel 12 carries a sprocket 30 connected by means of a chain 31 with the sprocket 32 mounted on a rotatable sleeve 33 disposed over the shaft 28. One end of the sleeve is provided with teeth 34 adapted to be engaged by teeth 35 on the end of a slidable sleeve 36 disposed on the shaft 28 in slidable keyed relation and actuated by means of a forked operating lever 37 provided with a handle 38 and suitable latch mechanism mounted in the bracket 40 carried by the supplemental frame bar 29. By this construction, it will be seen that as the sleeve 36 is thrown into or out of engagement with the sleeve 33 rotation will be imparted to the fan through the medium of the sprocket wheels and chains as described or the same may be thrown out of operation at will. The arrangement of the sprockets and chains is such that the ratio of the gearing is sufficient to provide for an extremely rapid rotation of the fan producing an air current of considerable intensity, and the disposition of the fan carrying brackets and its location in the frame is such that the fan will be disposed directly adjacent the cotton plant, as clearly illustrated in the drawings. The construction of the clutch mechanism already described with relation to the fan 17 is exactly similar to that used with the fans 18 and 19 on the opposite side of the frame, and, therefore, identical reference numerals have been applied in both instances, the only difference in the construction being that the fans 18 and 19 are disposed in close relation, working in opposite directions, with their main drive sprocket 25′ located between the two, whereby the fan 19 will be disposed directly in the rear of the main drive wheel 13. In operation, the fan 19 will direct its current of air across the cotton plant designated at 16, while the fan 18 will be directed across the plant 15, and the fan 17 across the cotton plant 14, thus taking care of three rows of cotton at one operation.

Directly in advance of the fan mechanism and in alignment with the cotton rows, is disposed a striker mechanism consisting of depending striker arms 41, carried by bars 42, supported on vertical stems 43 adjustably secured by means of lock nuts 44, in laterally extending arms 45 mounted in bearings 46 located on the bars of the frame, the arms 45 being laterally disposed therein by means of the set screws disposed in the bearings.

Arranged on the opposite side of each cotton stalk in relation to the fans, are collecting shields 48, 49 and 50. For clearness of description, the shield 48 is shown as being disposed opposite the fan 17, shield 49 as being disposed opposite the fan 18 and shield 50 as disposed opposite the fan 19. These shields comprise arcuate sheets of metal of a width and height sufficient to cover completely the cotton plant adjacent thereto, being carried by arcuate rods 51 secured at each end of the shield and projecting upwardly through transverse bores disposed in rock shaft 52 journaled in bearing brackets 53 secured on the frame bars, and carrying at one end the operating handles 54, whereby on rotation of the shaft by means of the handle 54 the shields 48, 49 and 50 will be swung arcuately to be brought into closer engagements with the cotton plants or other way as desired. Set screws 55 carried by the brackets 53 serve to maintain the adjustment of the rock shaft 52, and substantially vertical adjustment of the shields may be obtained by slidably adjusting the bars 51 through the shaft 52 by means of set screws. With this construction it will be seen that the shields may be raised or lowered vertically and also adjusted arcuately with respect to the cotton plant so as to be swung into or out of engagement therewith. Detachably mounted on the lower ends of the shields 48, 49 and 50 are collecting troughs 57 carrying upstanding hook flanges 58 adapted to be engaged in sockets 59, carried by the lower ends of the shields 48, 49 and 50, whereby they may be readily attached or detached therefrom. The troughs 57 are substantially semi-cylindrical, being provided with the closed ends and carrying at their inner edges longitudinally disposed oppositely extending inclined aprons 60, 61. The aprons 60 and 61 are preferably formed integral with the trough members and are so inclined that the innermost aprons designated as at 60 will serve to deflect the material blown from the cotton stalks upwardly against the inner surface of the collecting shields, while the aprons 61, owing to their inclination, will prevent accidental dislodgment of the material within the trough. Longitudinally spaced supporting wires 62 connect the inner edges of the trough with the uppermost apron of the shields 48, 49 and 50, as best illustrated in Figure 4, and at vertically spaced intervals are longitudinally disposed wires 63 extending from end to end of the collecting shields and secured to the wires 62, which construction provides a screening against which, when the fans are operated, the cotton stalks will be blown, and, due to the travel of the machine, agitation will be imparted to the plants supplemental to, and cooperating with, the agitation imparted thereto by means of the striker mechanism already described.

Furthermore, this construction of the net work or screening as described prevents the cotton plants from becoming caught within the collecting shields, thereby eliminating any possible injury to the plant during the operation of the machine.

In the modified form, as illustrated in Figures 6 and 7, the construction is practically the same as that of the preferred form with the exception that the frame comprising the side bars 1' and 2' and end bars 3' and 4' are supported by a single bearing wheel 64 located centrally of the frame and driving double fans 18' and 19', supported in supplemental longitudinal frame bars 65 and 66. The gear connection between the fan 18' and the main drive wheel is identical with that of the preferred form, but in this modification the fan is journaled on depending angular struts 22' and 23' which are secured at their upper ends to the main frame bar 66. In this modification of the machine, I provide balance wheels 67, disposed at opposite sides of the frame slightly in advance of the center thereof, and carried by brackets 68 laterally adjustable by means of the set screws 69, in bearings 70 disposed on the transverse bar 71 carried in the main frame of the machine. These balance wheels cooperating with the drive wheel 64 provide a three-point bearing, preventing any possibility of the machine slanting during its operation. In this modified form, the construction of the striker mechanism and collecting shield is exactly similar to that of the preferred form and the parts are indicated by primed numerals where they correspond to those made in the showing of the preferred form.

It is contemplated that the machine forming this invention is to be used in cotton fields before the cotton has attained any considerable growth and the fans are to be constructed of sufficient dimension to force the current of air across the entire cotton plant, blowing the boll weevils and punctured cotton squares into the collecting shields as described, from which they will drop into the troughs 57 and be retained therein until collected. The basic principle upon which this device operates is that of dislodgment of the boll weevil and the cotton squares, first, by means of a striker mechanism, and, second, by means of a strong current of air impinging against the cotton plant directly behind the striking means. It is characteristic of the cotton boll weevil that the moment any agitation is imparted to the plant upon which is is feeding it will curl up its legs and drop to the ground. By disposing the fans directly in the rear of the striker mechanism, as soon as the boll weevil begins to fall it will be caught by the strong current of air forced across the plant and carried into the collecting shield. The punctured cotton squares soon die and become loose on the stalk and these will be carried off by the strong current of air at the same time as the weevil. It is just as important to destroy these punctured squares as it is the boll weevil because each square contains an egg which will hatch within three weeks and produce another crop of boll weevil.

While I have illustrated and described certain details and materials which enter into the construction and operation of this invention, I desire it to be understood that I do not intend to limit myself to these, but that any such may be used as will fall within the scope of the invention as claimed.

I claim:

1. A machine of the character described comprising a wheeled frame, fan mechanism disposed in said frame, means for driving said fan mechanism, means for adjusting said fan mechanism substantially vertically within the frame, and striker mechanism disposed in said frame laterally of said fan mechanism and directly in advance thereof.

2. A machine of the character described comprising a wheeled frame, a plurality of fans located therein, a driving connection between the wheels of said frame and said fans, collecting members disposed in said frame, and in lateral spaced relation to said fans, means for adjusting said collecting members vertically within the frame, means for adjusting said collecting members arcuately relatively to the frame, and striker members carried by said frame directly in advance of said fans and collecting members.

3. A machine of the character described comprising a wheeled frame, depending brackets in said frame, fans journaled in said brackets, means for adjusting said fans vertically in said brackets, mechanism for operating said fans, collecting members disposed in said frame in spaced relation from said fans, means for vertical adjustment of said collecting members in the frame, means for rotatably adjusting said collecting members in the frame, and means for permitting lateral adjustment of said frame.

4. A machine of the character described comprising a wheeled frame adapted to straddle a plurality of cotton rows, fans disposed in said frame in spaced relation at one side of said cotton rows, collecting members disposed in said frame in spaced relation on the sides of said cotton rows opposite said fans, means for operating said fans for driving a current of air across said cotton rows, means for adjusting said collecting members in the frame, and means for adjusting said fans in the frame.

5. A machine of the character described, comprising a main frame, bearing wheels disposed at one end of said frame, means for adjusting said frame laterally to straddle a plurality of cotton rows, fans mounted in said frame at one side of said cotton rows, means for adjusting said fans vertically in the frame, collecting members disposed in said frame on the sides of the said cotton rows opposite said fans, means for adjusting said collecting members vertically in the frame, means for adjusting said collecting members rotatably in the frame, and striker mechanism carried by said frame in alignment with said cotton rows and directly in advance of said fans and collecting members.

6. A machine of the character described comprising a main frame, bearing wheels disposed at one end of said frame, means for adjusting said frame laterally to straddle a plurality of cotton rows, fans disposed in said frame at one side of said cotton rows, operating connection between the bearing wheels and said fans, shields disposed in said frame on the side of said cotton rows opposite said fans, means for adjusting said shields in the frame, collecting troughs detachably carried by said shields at the lower end thereof, and striker mechanism mounted in said frame in alignment with said cotton rows and directly in advance of said fans and shields.

7. In a machine of the character described, a wheeled frame adapted to straddle a plurality of cotton rows, fans disposed in said frame at one side of said cotton rows, arcuate shields disposed in said frame on the sides of the cotton rows opposite said fans and in lateral alignment therewith, collecting troughs detachably mounted in the lower ends of said shields, means for adjusting said shields in the frame relative to the cotton rows, supporting wires connecting said collecting troughs and the upper portions of said shields, vertically spaced longitudinal wires disposed between the ends of said supporting wires to form a guard for said shields, and striker mechanism disposed in said frame in alignment with the cotton rows and directly in advance of said fans and shields.

8. In a machine of the character described, the combination with a wheeled frame having fans disposed therein and adapted to straddle a plurality of cotton rows with the fans disposed at one side of said rows, of collecting members comprising arcuate shields disposed in said frame on the sides of said cotton rows opposite said fans and in lateral alignment therewith, arcuate rods carried by said shields, shafts journaled in said frame and provided with transverse bores, means for adjustably securing the rods on said shields in the bores of said rock shafts, means for adjustably securing said rock shafts in position in the frame, and detachable collecting troughs carried by the lower ends of said shields.

9. In a machine of the character described, the combination with a wheeled frame having fans disposed therein, and adapted to straddle a plurality of cotton rows with the fans disposed at one side of said rows, of collecting members comprising arcuate shields disposed in said frame on the side of said cotton rows opposite said fans, and in lateral alignment therewith, brackets in said frame, rock shafts journaled in said brackets, operating handles carried by said rock shafts, means for adjusting said rock shafts in the frame, said shafts being provided with transversely extending bores, arcuate rods carried by said shields and extending thereabove and slidably disposed through the bores in said rock shafts, means for adjustably securing said rods in the bores of said rock shafts, collecting troughs detachably carried by the lower ends of said shields, deflecting aprons on the inner edges of said collecting troughs, guard members between said deflecting aprons and the upper portions of said shields, operating mechanism in the frame for said fans, and striker mechanism disposed in said frame in alignment with said cotton rows and directly in advance of said fans and collecting members.

10. In a machine of the character described, the combination with a wheeled frame, of fans disposed in said frame, operating means for said fans, collecting members disposed in said frame in lateral spaced relation from said fans, means for adjusting said fans vertically within the frame, means for adjusting said collecting members verticallly within the frame, means for moving said collecting members arcuately within the frame, striker members vertically adjustable in said frame disposed in advance of said fans and collecting members and substantially midway therebetween.

11. In a machine of the character described, a wheeled frame adapted to straddle a plurality of cotton rows, depending brackets in said frame at one side of said cotton rows, fans adjustably mounted in said brackets, operating connection between the wheels of said frame and said fans, collecting members disposed in said frame on the side of said cotton rows opposite said fans and in lateral alignment therewith, means for adjusting said collecting members relative to the cotton rows, laterally extending brackets carried by said frame, vertical rods adjustably mounted in said brackets and depending therefrom, striker arms carried by the lower ends of said rods and in alignment with said cotton rows but directly in advance of said fans and collecting members.

In witness whereof I have hereunto affixed my hand this 3rd day of July, 1922.

CHARLES R. COOLIDGE.